July 16, 1940. M. GOLDBERG 2,208,255
STUFFING AND PACKING MACHINE
Filed Nov. 12, 1938 3 Sheets-Sheet 2
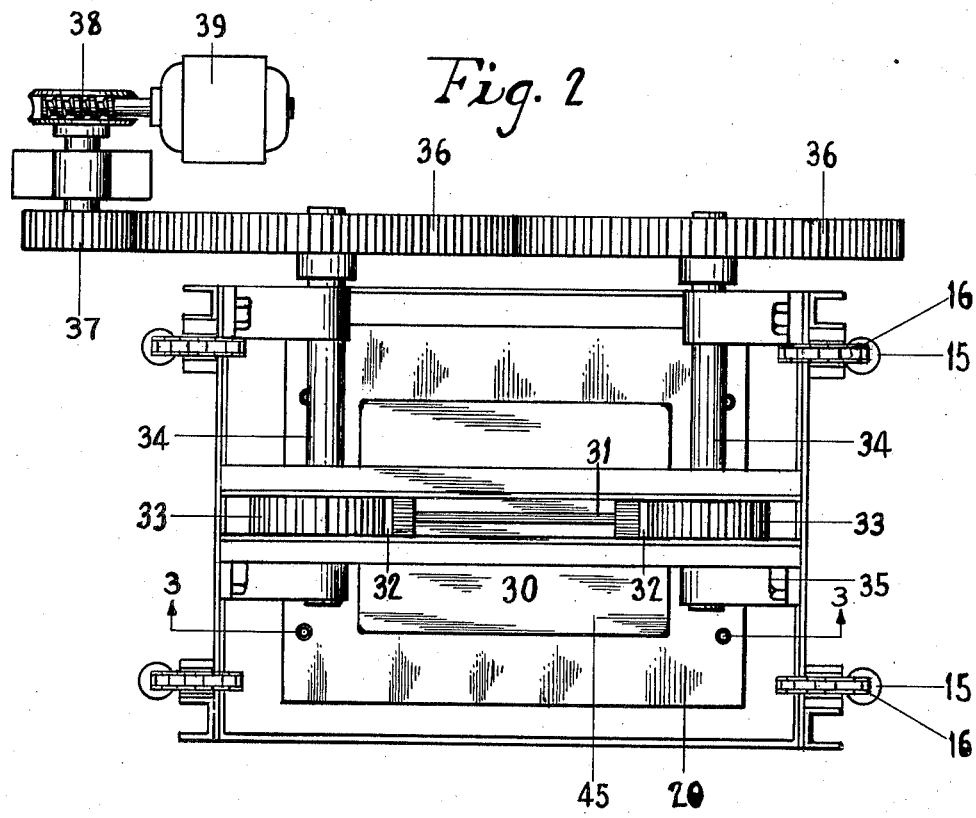
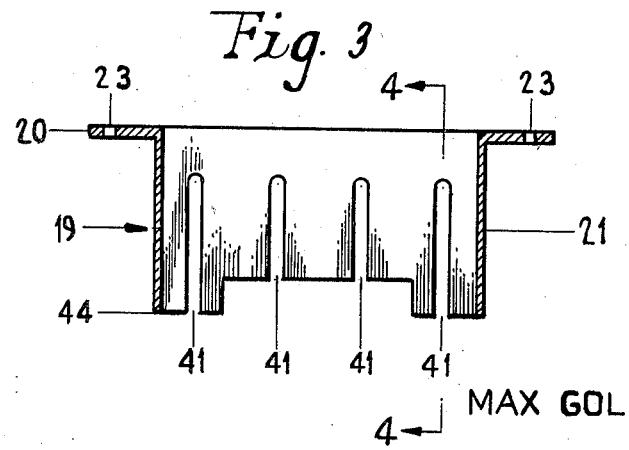
MAX GOLDBERG
INVENTOR.
BY Joseph Blacker
ATTORNEY.

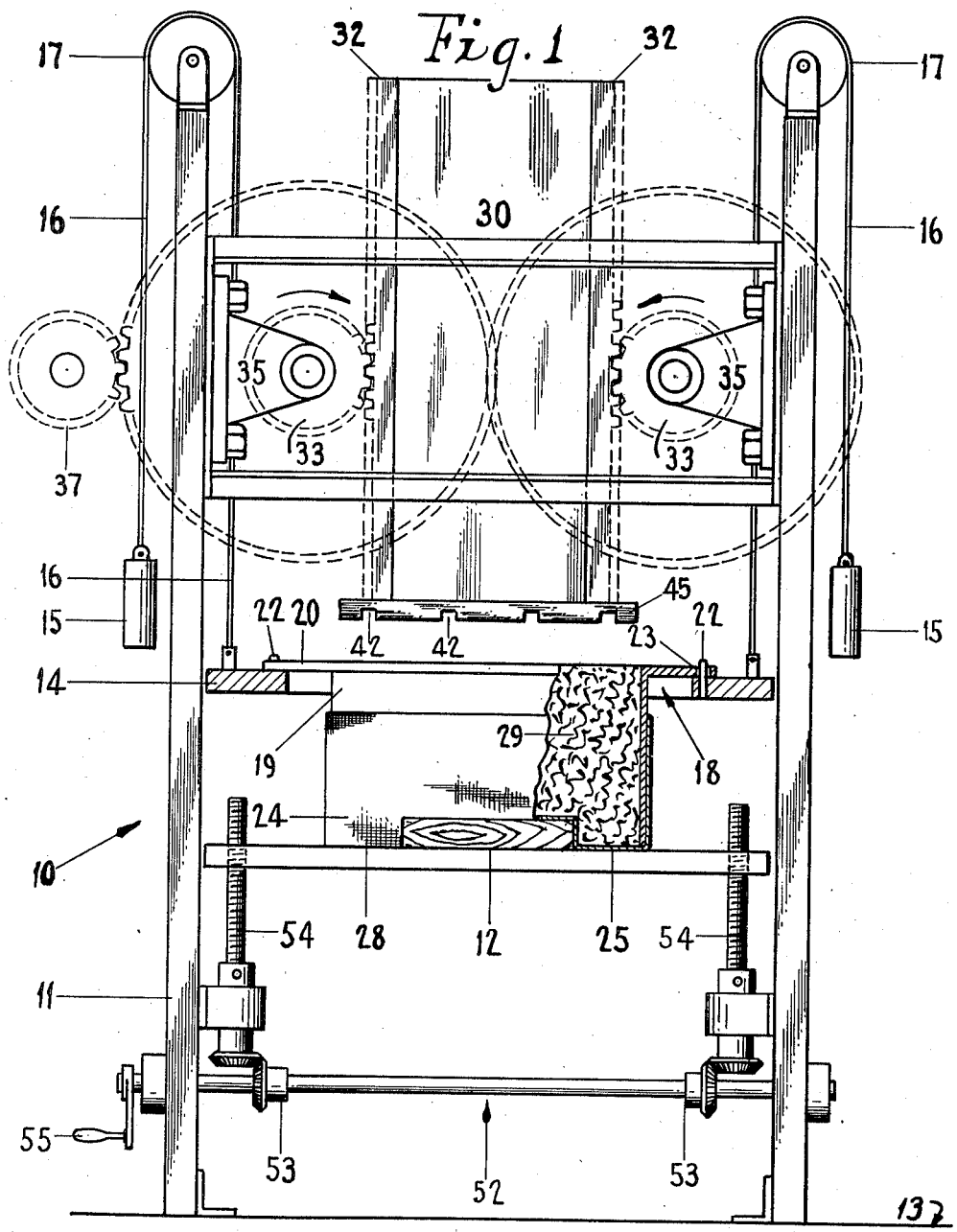

July 16, 1940.　　　M. GOLDBERG　　　2,208,255
STUFFING AND PACKING MACHINE
Filed Nov. 12, 1938　　　3 Sheets-Sheet 3
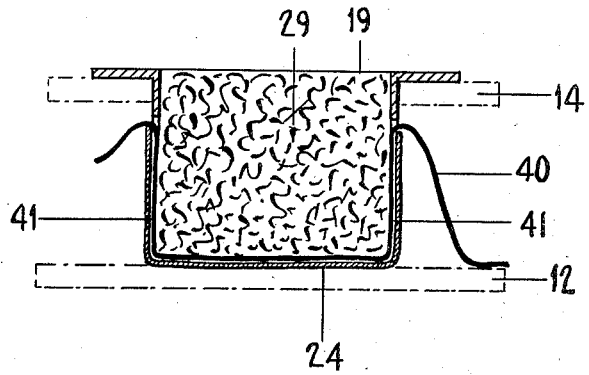
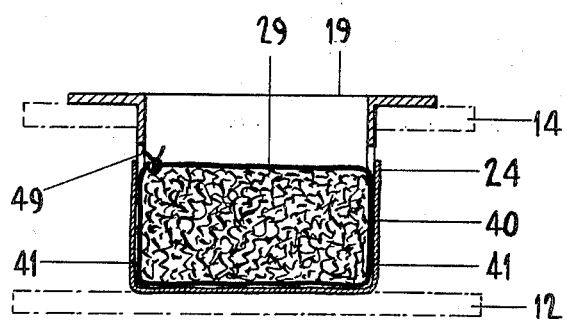
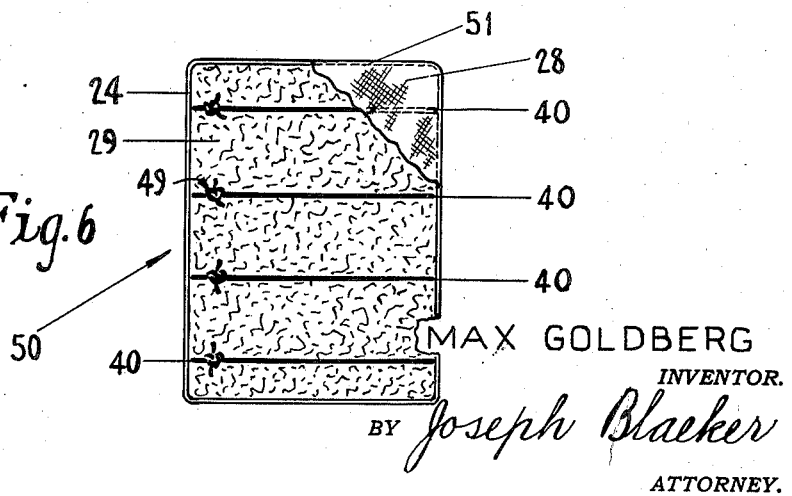
MAX GOLDBERG
INVENTOR.
BY Joseph Blacker
ATTORNEY.

Patented July 16, 1940

2,208,255

UNITED STATES PATENT OFFICE 2,208,255

STUFFING AND PACKING MACHINE

Max Goldberg, New York, N. Y.

Application November 12, 1938, Serial No. 239,993

2 Claims. (Cl. 226—43)

This invention relates to a stuffing and packing machine for filling hassock casings, cushions, etc., with light materials such as excelsior or other fibrous materials in a highly compressed state.

The primary object of this invention is to insure thorough compression of the material within the hassock casing which, owing to its light and fluffy nature, is apt to puff out forcibly when released from the compression.

Another object of this invention is to provide a stuffing and packing machine designed for supporting various sizes of filler-forms in suspended relation above an operating table or platen and to provide a plunger head designed for contacting and exerting pressure on the entire surface area of filler-forms of various sizes and cross-sections.

Another object of this invention is to provide a movable platform for suspending the filler-form and to provide counterbalance means for raising the platform for stripping or removing the hassock casing from the filler-form when the plunger is substantially at the upper rim of the fibrous filled hassock.

Another object of this invention is to provide mechanism for causing the plunger to move in alinement throughout its area so that the fibrous material will be uniformly condensed.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a front view of the machine, the filler-form being partly broken away and showing the height of the filling material before compression.

Figure 2 is a plan view of the machine.

Figure 3 is a longitudinal cross-sectional view of the filler-form, the section being taken as on line 3—3 in Figure 2.

Figure 4 is a cross-sectional view of a filler-form, the section being taken as on line 4—4 in Figure 3, and showing filling material before compression.

Figure 5 is a cross-sectional view of the filler form shown in Figure 4, and showing the filling material in a compressed state.

Figure 6 shows the filled hassock casing ready for stitching the top covering layer thereto.

In the illustrated embodiment of the invention, the numeral 10 indicates a stuffing and packing machine for hassock casings and the like, comprising a rectangular frame 11 having a horizontal pressure resisting bed or platen 12 which is positioned at an elevation above the floor line 13, suitable for operating purposes.

The machine comprises a movable platform 14 which is supported in substantially horizontal positions by counterweights 15 and sprocket chains 16 riding over sprocket wheels 17. The platform 14 has a through aperture 18 centrally thereof.

A filler-form 19 which may be rectangular in cross-section is mounted in the aperture 18. The filler-form has a flange 20 at its upper elevation which is brought to rest on the platform 14. The filler-form is made of metal.

It is to be noted that the aperture 18 in the platform is much larger than the exterior conformation of the filler-form 19 so as to permit insertion therein of filler-forms of different exterior conformations or size. For the purpose of alining the various sized filler-forms with the said aperture, I may provide dowel pins 22 extending upwardly from the platform 14. The flanges of the filler-forms may be provided with apertures 23 designed to receive the dowel pins. The apertures 23 are spaced apart similar to the spacing of the dowel pins. It will thus be noted that irrespective of the exterior conformation of the various sized filler-forms, when a filler-form is inserted in the aperture 18, it will always be brought into proper operating position in the said aperture.

As shown in Figure 1 the exterior conformation of the filler-form 19 is preferably slightly larger than the inner conformation of the hassock casing 24 into which the material is to be packed, so that a hassock casing can be frictionally slipped onto the filler-form and thereby suspended and frictionally held in a vertical and open position.

A plunger 30 has been mounted in the frame 11 for up and down motion. The plunger 30 comprises a web plate 31 having rack-bars 32, 32 integrally secured thereto at opposite ends. The web plate and the rack-bars are positioned in operative alinement in a vertical plane. Pinion gears 33 have been mounted on horizontal shafts 34 disposed within bearings 35 in the frame and intermesh with the teeth of the rack-bars. Spur gears 36 connect the shafts for rotation in opposite directions. A pinion gear 37 in engagement with one of the gears 36 is driven by worm gearing 38 and an electric motor 39. By operating the motor 39, the plunger 30 is actuated into the filler-form 19 for compressing filling material loosely thrown therein.

As best shown in Figure 3, each filler-form 19 comprises a hollow frame 21 which is open at the top and bottom and has vertical slots 41 in alinement on opposite sides. The height of the slots is made to be substantially in line with or slightly above the height of the hassock casing to be filled. The slots extend from the lower surface 44 of the frame and stop short of the upper flanged surface a sufficient distance for the required compression of the filling material.

Figures 4 and 5 show two steps in the method of producing hassocks according to my invention. As shown in Figure 4, filling material 29 has been loosely thrown into the filler-form 19 before compression. It will be noted that a cord or wire 40 has been placed on the bottom surface of the hassock casing 24, the cord being carried upwardly along the height of the slots 41 and outwardly of said casing and resting on the bed 12.

As shown in Figure 5 the filling material 29 is in a compressed state. It will be noted that the cord or wire 40 has been passed around the compressed filling material and has been knotted, as indicated by the numeral 49. Cords 40 are similarly placed at the other slots 41 and the compressed material tied around at a plurality of points.

Figure 6 shows the compressed material 29 inside the filled hassock casing with a plurality of spaced cords passed completely around the material, the ends of the cords being suitably secured together. The substantially finished hassock 50 is ready for stitching the top covering layer 28 thereon.

*Operation of invention*

The platform 14 and a filler-form 19 are raised in spaced relation from the bed 12. A hassock casing 24 is then pulled upwardly in frictional engagement over and around the suspended filler-form. The platform 14 is then lowered until the bottom of the hassock casing rests on the properly shaped table 12, depending on the shape of the bottom surface 25 of the hassock casing.

The cords or wires 40 are placed on the bottom surface of the hassock casing 24 and their ends pass through the slots 41 in the sides of the filler-form and hang loosely through the slots. The operator drops a quantity of loose filling material 29 into the filler-form 19 and starts the plunger motor 39 and lowers the plunger by means of the worm gear driving power 38.

It is to be noted that due to the very high compressibility of the loose and puffed up filling material, such as excelsior, it is necessary in actual practice to again add loose material into the filler-form after each compression operation and repeat the said plunger compression movements thereby performing repeated compression operations until the required density is reached in the filling.

When the compression is finished and while the filling material is under compression the cords 40 are passed through the slots in the filler-form and through grooves 42 in the lower face of the bottom plate 45 of the plunger. The cords are passed completely around the substantially finished hassock and the ends of each cord are knotted together.

The plunger is held in the compression position and the platform is raised, thereby withdrawing or stripping the filler-form from the hassock casing. The plunger is then raised and the hassock is removed. A properly shaped piece of fabric 28, forming the top covering of the hassock casing when finished, is laid over the top of the filled, compressed and tied hassock casing. The covering layer 28 is then secured to the casing 24 by stitching such as is shown by the numeral 51 to the filled hassock casing. An empty hassock casing is then pulled up in frictional engagement around the filler-form and the operation is repeated.

It is to be understood that a considerable number of filler-forms of varying cross-sections will be used in a single stuffing and packing machine, each filler-form being of the desired cross-section corresponding to the cross-section of the hassock casing to be filled.

It is to be noted that while I have shown an operating table 12 which is fixed during operating conditions and a movable platform 14, that I may accomplish the same results by providing a movable or removable table and a fixed platform. In both cases, however, the platform and table are relatively movable to each other.

It is also to be noted that the claim to the method of manufacture is not limited to the particular mechanism herein described.

From the foregoing description of the various parts of the apparatus and the steps included in the method, the operation of the same may be readily understood. The knots preferably are of the slip-knot type and the knotted ends of the tying strands 49 are pulled over from the side where the knot is formed to a position inside the hassock casing.

In practice, the covering layer 28 will form the bottom of the hassock.

As shown in Figure 1, I may employ a raising and lowering device 52 which may be operated through gearing 53 and screws 54 as shown. A handle 55 may be used for rotating the screws 54 thereby raising and lowering the platform 14.

In accordance with the patent statutes I have illustrated what I presently consider a preferred embodiment, but it is to be noted that many modifications may be made therein by those skilled in this art within the scope of the appended claims. I may provide an embodiment in which the filler-forms will have vertical openings at the corners only. I may also produce hassocks without the internal tying cords or wires.

I claim:

1. A stuffing and packing machine for filling hassock casings with fibrous materials, comprising an upright frame, a vertically adjustable table mounted in said frame, a platform having a through central aperture therein and being supported by counterweights in vertically movable relation in said frame, a filler-form having a flat circumscribing flange at its upper elevation and being mounted in said aperture and supported by said platform, said platform having dowel pins and said flange having apertures for receiving said dowel pins for aligning said filler-form in said aperture, said filler-form being designed for frictionally supporting a hassock casing in a vertical and open position, a plunger mounted for vertical motion in said frame and in alinement with said filler-form, racks secured to said plunger at opposite points thereof, gears in engagement with said racks and being rotatably mounted on shafts in said frame, gearing connections with said shafts for actuating said plunger in alinement with said filler-form for compressing filling material therein, and means for raising said platform for stripping said hassock casing from said filler-form while said plunger is kept stationary at substantially the upper level of said hassock casing and while said filling material is under compression.

2. A stuffing and packing machine for filling hassock casings with fibrous materials, comprising an upright frame, a vertically adjustable table mounted in said frame, a platform having a through central aperture therein and being supported by counterweights in vertically movable relation in said frame, a filler-form having a flat circumscribing flange at its upper elevation and being mounted in said aperture and supported by said platform, said platform aperture being of larger cross-section than said filler-form cross-section, said platform having dowel pins and said flange having apertures for receiving said dowel pins for aligning said filler-form in said aperture, said filler-form being designed for frictionally supporting a hassock casing in a vertical and open position, a plunger mounted for vertical motion in said frame and in alignment with said filler-form, racks secured to said plunger at opposite points thereof, gears in engagement with said racks and being rotatably mounted on shafts in said frame, gearing connections with said shafts for actuating said plunger in alignment with said filler-form for compressing filling material therein, and means for raising said platform for stripping said hassock casing from said filler-form while said plunger is kept stationary at substantially the upper level of said hassock casing and while said filling material is under compression.

MAX GOLDBERG.